(12) United States Patent
Santos

(10) Patent No.: US 9,235,289 B2
(45) Date of Patent: Jan. 12, 2016

(54) TOUCH MOTION DETECTION METHOD, CIRCUIT, AND SYSTEM

(75) Inventor: Maria Rhea Santos, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 234 days.

(21) Appl. No.: 13/562,217

(22) Filed: Jul. 30, 2012

(65) Prior Publication Data

US 2014/0028609 A1 Jan. 30, 2014

(51) Int. Cl.
G06F 3/041 (2006.01)
G06F 3/044 (2006.01)

(52) U.S. Cl.
CPC .............. *G06F 3/0416* (2013.01); *G06F 3/044* (2013.01)

(58) Field of Classification Search
CPC ....................................................... G06F 3/041
USPC ................................................ 345/173–179
See application file for complete search history.

(56) References Cited

U.S. PATENT DOCUMENTS

| | | | |
|---|---|---|---|
| 5,543,588 A | 8/1996 | Bisset et al. | |
| 8,487,912 B1 * | 7/2013 | Peterson | 345/175 |
| 2007/0046643 A1 * | 3/2007 | Hillis et al. | 345/173 |
| 2007/0176906 A1 * | 8/2007 | Warren | 345/173 |
| 2007/0229477 A1 | 10/2007 | Ludwig | |
| 2009/0273583 A1 | 11/2009 | Norhammar | |
| 2011/0205169 A1 * | 8/2011 | Yasutake | 345/173 |
| 2012/0161794 A1 | 6/2012 | Ningrat | |

OTHER PUBLICATIONS

Fontanella, L. et al., "Touch Position Determining Device and Method, and Electronic Touch-Sensitive Devise," pp. 1-14, U.S. Appl. No. 11/990,384, filed Jun. 5, 2009.
STMicroelectronics, "S-Touch advanced resistive touchscreen controller with 8-bit GPIO expander," pp. 1-65. Doc ID 14489 Rev 6. www.st.com, Sep. 2011.

* cited by examiner

*Primary Examiner* — Waseem Moorad
(74) *Attorney, Agent, or Firm* — Seed IP Law Group PLLC

(57) ABSTRACT

A touch controller includes a touch frame processing (TFP) component that receives sensor signals containing information about a touch point on a touch screen. The TFP component processes the sensor signals to generate touch information associated with each touch point. The touch information includes a location and the association of one of a touch-in, touch-out, and touch-motion event. A touch coordinate processing (TCP) component receives touch information from the TFP component and determines whether to report the touch information associated with a current touch point. The TCP component determines a difference between the location of the current touch point and a previously detected touch point and assigns a motion status to each touch event and reports the touch information when the difference is greater than a motion tolerance and when less than the motion tolerance selectively blocks or reports the touch information as a function of the corresponding motion status.

19 Claims, 11 Drawing Sheets

| TIDn | Location Information (X,Y) | Touch-Event (TE) Type | Other Touch Point Parameters (Pressure, Size, etc.) |

Touch Information (TI)

*FIG. 1B*

TOUCH MOTION DETECTION METHOD, CIRCUIT, AND SYSTEM

TECHNICAL FIELD

The present invention relates generally to touch screens and relates more specifically to the detection of movement of a touch point on the touch screen.

BACKGROUND

Touch screens are present in many different types of common modern electronic devices, such as cellular telephones, tablet computers, portable music and video devices, personal digital assistants, portable gaming devices, and so on. In these electronic devices the touch screen is part of the user interface of the device. The touch screen typically includes a display, touch sensors, and a touch controller. The touch sensors are typically some sort of transparent sensor array, such as an ultrasonic, resistive, vibration, or capacitive sensor array, that is attached to or formed as an integral part of the display. When a user touches the sensor array either with a finger or a stylus, the sensor array generates corresponding electronic sensor signals that are provided to the touch controller. From these sensor signals, the touch controller determines the type of "touch event" along with various characteristics of the touch event, and provides this information to processing circuitry in the electronic device. The processing circuitry operates in response to this information to allow a user to control the electronic device through these touches of the touch screen.

The touch controller typically captures frame data from the touch sensors and processes this frame data to determine the type of touch event that has occurred on the touch screen. This processing is typically referred to as touch frame processing and through this processing the touch controller determines the type of touch event and the location of the touch event on the touch screen. The touch controller must detect and report (to the processing circuitry) different types of touch events, such as when a user initially touches the touch screen, when the user has stopped touching the touch screen, and when a touch is moving on the touch screen, and when a moving touch has stopped moving.

The reliable detection of whether a touch is moving, or whether a moving touch as stopped moving, can be difficult. There is accordingly a need for improved circuits and methods of detecting the movement and stopping of movement of touches on a touch screen.

SUMMARY

According to one embodiment of the present invention, a touch controller includes a touch frame processing component adapted to receive sensor signals containing information about a touch point on a touch screen. The touch frame processing component processes the sensor signals to generate touch information associated with each touch point. The touch information includes a location of the touch point and the association of one of a touch-in, touch-out, and touch-motion type of event with the touch point. A touch coordinate processing component is coupled to receive touch information from the touch frame processing component and is operable to determine whether to report touch information associated with a current touch point. The touch coordinate processing component is operable to determine a difference between the location of the current touch point and the location of a previously detected touch point and to assign a motion status to each touch event. The touch coordinate processing component is operable to report the touch information associated with the current touch point when the difference is greater than a motion tolerance and is further operable when the difference is less than the motion tolerance to selectively block or report the touch information as a function of the corresponding motion status.

BRIEF DESCRIPTION OF THE DRAWINGS

FIG. 1B is a diagram graphically illustrating the content of the touch information generated by the touch controller of FIG. 1A.

DETAILED DESCRIPTION

Figure 1A:
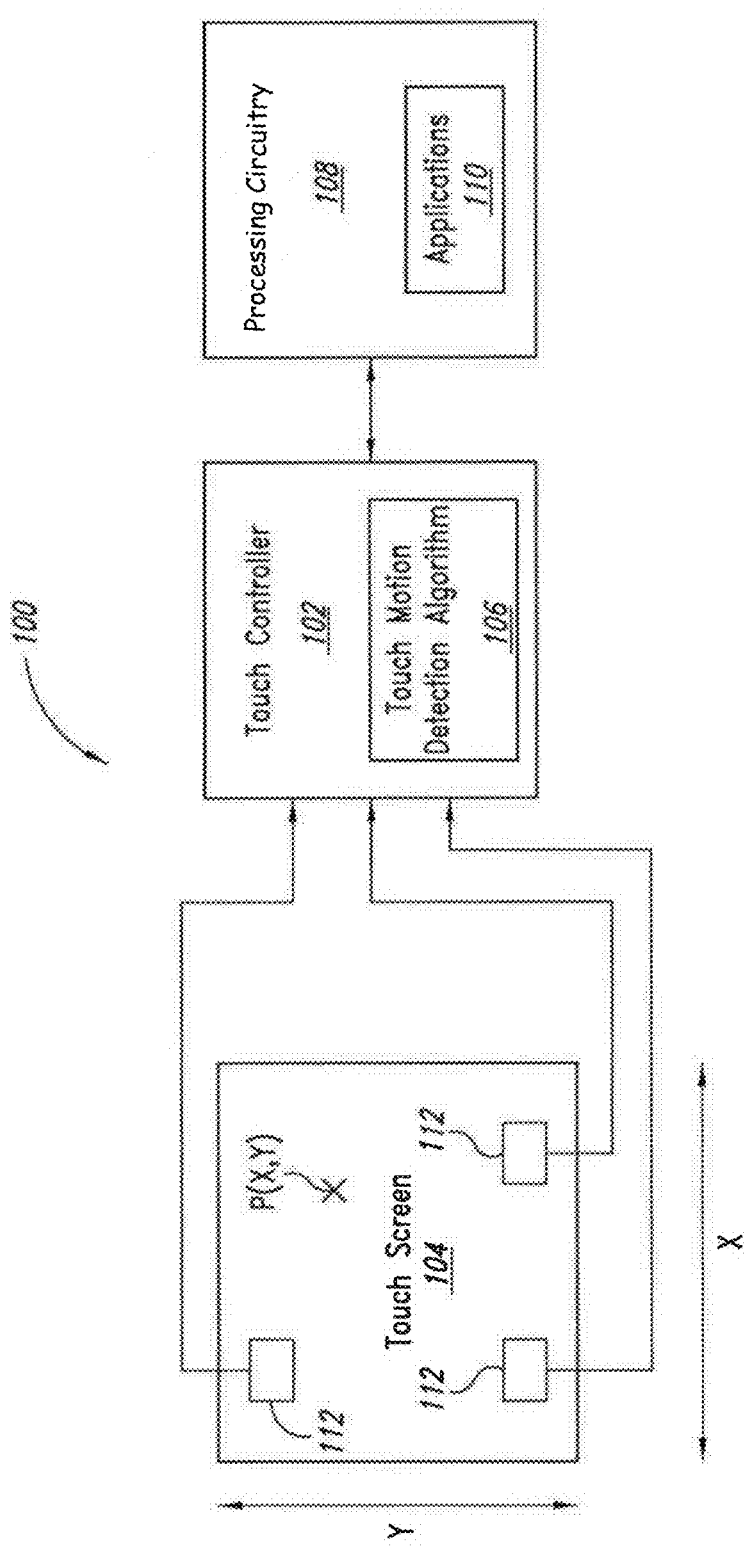
FIG. 1A is a functional block diagram of an electronic device including a touch controller operable to execute a touch-motion detection algorithm according to one embodiment of the present invention.

FIG. 1A is a functional block diagram of an electronic device 100 including a touch controller 102 that executes a touch-motion detection algorithm according to one embodiment of the present invention. In operation, the touch controller 102 detects touches or touch points P(X,Y) on a touch screen 104 and associates a touch event with each detected touch, and thereafter executes a touch-motion detection algorithm 106 to determine whether to report the touch event or to block reporting of the touch event to processing circuitry 108, as will be described in more detail below. In this way the touch controller 102 reports only touch points P(X,Y) that the touch-motion detection algorithm 106 determines should be reported to the processing circuitry 108, preventing applications or "apps" 110 running on the processing circuitry from taking unwanted or unintended actions, as will also be described in more detail below.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well-known components and/or processes has not been shown or described in detail below to avoid unnecessarily obscuring the present invention.

The touch screen 104 includes a number of touch sensors 112 positioned on the touch screen to detect touch points P(X,Y), with three touch sensors being shown in the embodiment of FIG. 1A. Each touch sensor 112 generates a corresponding sensor signal responsive to a touch point P(X,Y) and provides this signal to the touch controller 102 for processing. The touch sensors 112 are typically contained in some sort of transparent sensor array that is part of the touch screen 104. The number and location of the sensors 112 can vary as can the particular type of sensor, such as ultrasonic, resistive, vibration, or capacitive sensors, as will be appreciated by those skilled in the art. Three sensors 112 positioned as shown are illustrated merely by way of example.

A user touching the touch screen 104 with his or her finger, stylus, or other suitable device corresponds to a touch point P(X,Y). In response to a touch point P(X,Y), the sensors 112 generate respective signals that are provided to the touch controller 102 which, in turn, processes these signals to generate touch information TI for the corresponding touch point. The touch information TI that the touch controller 102 generates for each touch point P(X,Y) includes location information and touch-event (TE) information for the touch point, and typically includes other information as well such as the size of the touch point, the pressure of the touch point, a touch-point identifier TIDn, and so on, as will be appreciated by those skilled in the art. This is illustrated graphically in the diagram of FIG. 1B. The location information is an X coordinate and a Y coordinate that together define the location of the touch point P(X,Y) on the surface of the touch screen 104. An X-axis and Y-axis are shown in FIG. 1A, with the X coordinate corresponding to a point along the X-axis and the Y coordinate to a point along the Y-axis. Thus, a touch point $P(X_1, Y_1)$ corresponds to a touch point on screen 104 at location $X_1$ on the X-axis and $Y_1$ on the Y-axis. The touch controller 102 scans the sensor signals of the sensors 112 and processes these signals to generate the touch information TI. The sensed or detected values of the sensor signals from all sensors 112 at a given point in time (i.e. for a given scan) is termed "frame data." Accordingly, the touch controller 102 processes frame data from one or more frames to determine touch information TI for each touch point P(X,Y), as will be described in more detail below with reference to FIGS. 2A-2C.

Figure 2A:
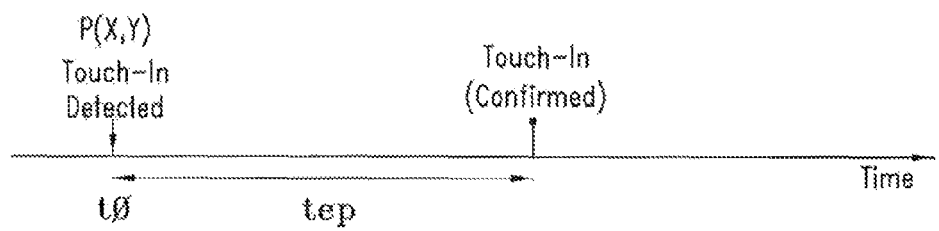
FIGS. 2A-2C are diagrams illustrating touch-in, touch-motion, and touch-out types of touch events, respectively.

As previously mentioned, the touch information TI that the touch controller 102 generates also includes touch-event TE information. This touch-event TE information associates one of three types of touch events with each touch point P(X,Y): 1) touch-in event; 2) touch-motion event; and 3) touch-out event. The detection of a touch-in event is illustrated in FIG. 2A and is the initial occurrence of a touch point P(X,Y). A touch-in event may be defined as moving downward on an area of the touch screen 104 over a period of time tep. So the touch controller 102 determines a touch-in event has occurred if an initial touch point P(X,Y) is detected and the point is determined to be moving downward on an area on the touch screen 104 over the time tep. For example, where the touch screen 104 is a capacitive touch screen, a touch-in event may be defined as a decreasing capacitance value with respect to a "no-touch" reference capacitance value or as a decreasing voltage over the time tep. As seen in the example of FIG. 2A, the touch controller 102 detects an initial touch-point P(X,Y) at a time t0 and determines that this touch point appears to be a touch-in event. The touch controller 102 subsequently monitors parameters associated with this initial touch point P(X,Y) and determines whether the touch point is moving downward on an area of the touch screen 104 over the time tep. During this time period between times t0 and tep the touch controller 102 monitors frame data from the sensor signals from sensors 112. At the time tep after the initial time t0 the touch controller 102 determines the touch point P(X,Y) corresponds to a touch-in event and associates a touch-in event with this touch point.

Figure 2B:
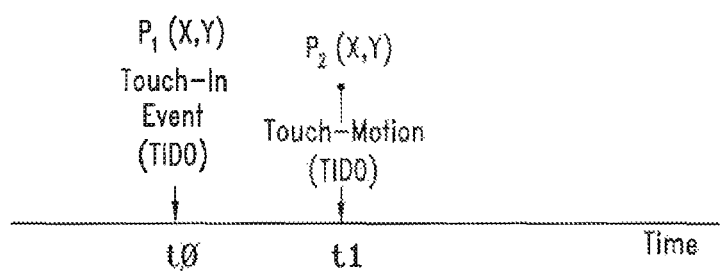

FIG. 2B illustrates the detection of a touch-motion event by the touch controller 102. The touch controller 102 determines a touch-motion event has occurred if a succeeding touch point is associated with a previous touch point P(X,Y) or touch-in event. Assume, for example, an initial touch point $P_1(X,Y)$ has been detected at a time t0 as seen in FIG. 2B and that this initial touch point is a touch-in event. Now assume a succeeding or subsequent touch point $P_2(X,Y)$ is detected at a time t1. Because a prior touch-in event or prior touch point $P_1(X,Y)$ exists, the touch controller 102 associates a touch-motion event with this subsequent touch point $P_2(X,Y)$. A touch-motion event indicates movement across the touch screen 104, such as when a user is sliding his or her finger across the touch screen to perform a desired action. Thus, when a previous touch point $P_1(X,Y)$ exists, either in the form of a touch point that is a touch-in event or a prior touch-motion event, and the touch controller 102 detects a subsequent touch point $P_2(X,Y)$ then the touch controller associates a touch-motion event with this subsequent touch point.

Figure 2C:
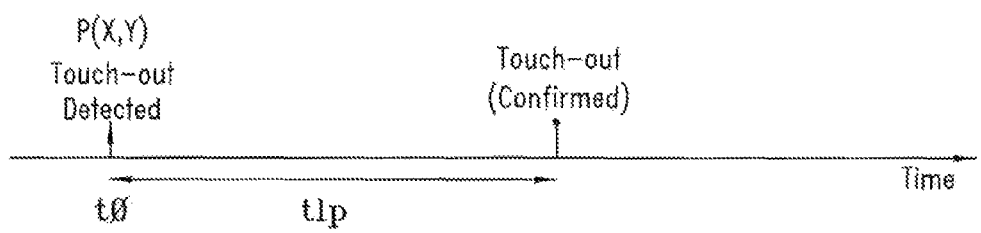

FIG. 2C illustrates the detection of a touch-out event by the touch controller 102. A touch-out event may be defined as moving upward on an area of the touch screen 104 over a period of time tlp. The touch controller 102 determines a touch-out event has occurred if "no touch" is detected for a touch point P(X,Y) and the point is determined to be moving upward on an area on the touch screen 104 over the time tlp. Where the touch screen 104 is a capacitive touch screen, a touch-out event may be defined as an increasing capacitance value or returning to the no-touch reference capacitance value, or as an increasing voltage over the time tlp. FIG. 2C illustrates the touch controller 102 detects a touch-point P(X,Y) at a time t0 and determines that this touch point appears to be a touch-out event (e.g., the associated capacitance or voltage has increased above a threshold value). The touch controller 102 subsequently monitors parameters associated with this touch point P(X,Y) and determines the touch point is moving upward on an area of the touch screen 104 over the time tlp. Thus, at the time tlp after the initial time t0 the touch controller 102 determines the touch point P(X,Y) corresponds to a touch-out event and associates a touch-out event with this touch point.

Figure 3:
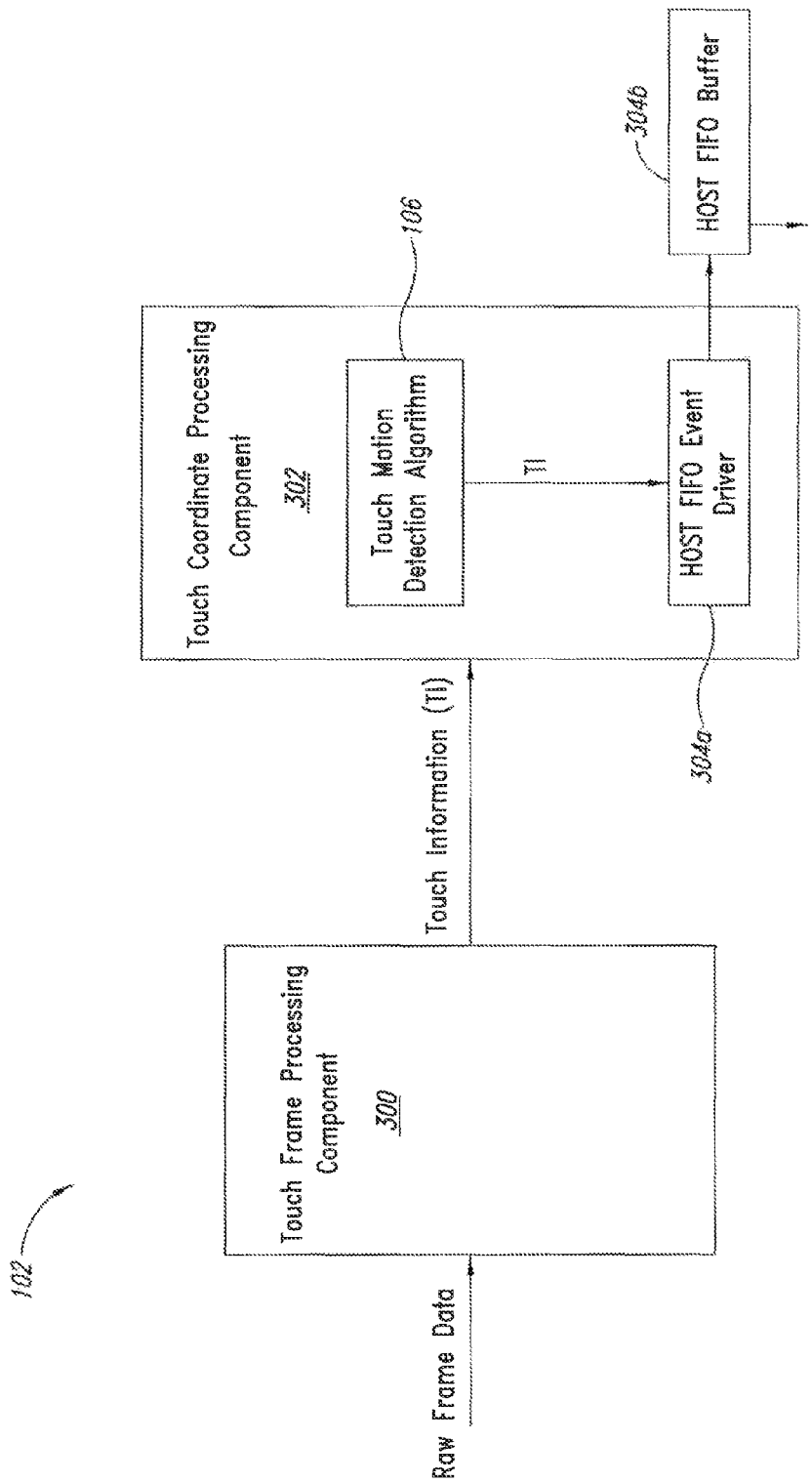
FIG. 3 is a functional block diagram of the touch controller of FIG. 1 according to one embodiment of the present invention.

FIG. 3 is a functional block diagram of the touch controller 102 of FIG. 1A according to one embodiment of the present invention. In the embodiment of FIG. 3 touch controller 102 includes a touch frame processing component 300 that receives frame data that includes sensor signals from the touch sensors 112 (FIG. 1A). As previously discussed, the sensor signals from the touch sensors 112 contain information about touch points P (X,Y) on the touch screen 104 (FIG. 1A). The touch frame processing component 300 processes the frame data including the sensor signals to generate touch information for detected touch points P(X,Y) on the touch screen 104. As previously described, this touch information includes the actual detection itself of a given touch point P(X,Y) along with determination of location information in the form of X and Y coordinates along with event type information for the touch point (i.e., whether a touch-in, touch-motion, or touch-out event is associated with the touch point). The determined touch information for a given touch point P(X,Y) is assigned a touch-event identifier TIDn and this touch-event identifier along with the corresponding location and event type information are output by the touch frame processing component 300, as seen in FIG. 3 for touch-event identifiers TID0, TID1, . . . TIDn.

A touch coordinate processing component 302 receives touch information from the touch frame processing component 300 and executes the touch-motion detection algorithm 106 to determine whether to report the touch information TI to the application 110 executing on processing circuitry 108 in the electronic device 100 of FIG. 1A. When the touch motion detection algorithm 106 determines the touch information TI should be reported to the application 110, the touch information TI for the current touch point P(X,Y) is provided to a first-in-first-out (FIFO) buffer 304 including a software driver 304a and hardware buffer 304b as shown in FIG. 3. The FIFO buffer 304 stores the touch information TI for a number of touch points P (X, Y) being reported and subsequently provides the stored touch information to the application 110 (FIG. 1A) on a first-in-first-out basis. In this way, when the touch motion detection algorithm 106 stores the touch information TI of a detected touch point P (X, Y) in the FIFO buffer 304 the touch motion detection algorithm is said to have "reported" the touch information TI to the application 110. Conversely, when the touch motion detection algorithm 106 determines the touch information TI should not be reported to the application 110, the algorithm does not report or "blocks" reporting of the touch information by not providing the touch information to the FIFO buffer 304.

In operation, when the touch frame processing component 300 detects the presence of a touch point P (X, Y), the component determines the type of touch event TE associated with the detected touch point and provides the corresponding touch information TI to the touch coordinate processing component 302. From this touch information TI, the touch motion detection algorithm 106 determines the type of touch event TE contained in the received touch information for the detected touch point P (X, Y). When the touch event TE associated with the detected touch point P (X, Y) is a touch-out event, the touch motion detection algorithm 106 reports the corresponding touch information TI. Similarly, when the touch event TE associated with the detected touch point P (X, Y) is a touch-in event, the touch motion detection algorithm 106 reports the corresponding touch information TI. The touch-motion detection algorithm 106 also assigns the motion status to the current touch point P (X, Y) when the touch event TE is either a touch-out or touch-in event. In either case the touch-motion detection algorithm 106 initially sets the motion status to the stationary state.

When the touch event TE information of the current touch point P(X,Y) is neither a touch-out nor touch-in event then this means the touch event must be a touch-motion event. In this situation the touch-motion detection algorithm 106 is operable to determine a difference between the location of the current touch point P (X, Y) and the location of a previously detected touch point. So for example in FIG. 2B, the touch-motion detection algorithm 106 determines the difference between the locations of touch points $P_1(X_1,Y_1)$ and $P_2(X_2, Y_2)$. The difference between the locations of the two touch points P(X,Y) is designated $\Delta P$ and is defined as $|X_2-X_1|$, $|Y_2-Y_1|$. So $\Delta P=(|X_2-X_1|,|Y_2-Y_1|)$. This difference $\Delta P$ is compared to a motion tolerance $W_T=(WT_X, WT_Y)$ that defines a minimum distance between two touch points P(X, Y) that the touch-motion detection algorithm 106 utilizes in determining whether to report the touch information to the application 110. The units of the motion tolerance $W_T$ are in pixels in one embodiment of the present invention, but may have other units in other embodiments. The motion tolerance $W_T$ defines a pixel threshold, as will be described in more detail below.

In operation, the touch coordinate processing component 302 determines the difference $\Delta P$ between the locations of the current touch point P(X,Y) and the location of a previously detected touch point. When this difference $\Delta P$ is greater than the motion tolerance $W_T$, the touch motion detection algorithm 106 reports the touch information TI by providing the touch information TI for the current touch point P(X,Y) to the FIFO buffer 304, as previously described.

When the difference $\Delta P$ is less than the motion tolerance $W_T$ ($\Delta P<W_T$), the touch-motion detection algorithm 106 initially determines the motion status assigned to a previously detected touch point P (X, Y). The motion status is one of two states, stationary and in-motion as previously described. The algorithm does not report the current touch information TI when the motion status is stationary. When the motion status is in-motion, the touch-motion detection algorithm 106 utilizes two additional parameters, a frame hysteresis value $W_C$ and a frame count value FC, in determining whether to report or block the touch information TI for a current touch point P(X,Y). The frame hysteresis value $W_C$ and frame count value FC are utilized to limit the reporting of touch information TI for currently detected touch points P (X, Y) when the difference in location (X,Y) between these currently detected touch points and a previously detected touch point does not exceed the motion tolerance $W_T$ for a given number of detected touch points given by the frame hysteresis value, as will be described in more detail below.

The detailed operation of the touch-motion detection algorithm 106 will now be described in more detail with reference to the flowchart of FIGS. 4A and 4B, which illustrates a process 400 corresponding to the touch-motion detection algorithm 106 according to one embodiment of the present invention. The process begins in step 400 and proceeds immediately to step 402 and determines whether a new touch point P(X,Y) and corresponding new touch event TE have been detected. The process proceeds no further until such a new touch event TE is detected. Once a new touch event TE is detected, the process goes to step 406 and determines whether the new touch event is a touch-out event. If the new touch event TE is a touch-out event the process proceeds to step 408 and this touch-out event is reported. More specifically, referring to FIG. 3 touch-motion detection algorithm 106 reports the touch information TI including the touch-out event information. From step 408 the process proceeds to step 410 and resets the frame count FC=0. Recall, the touch-motion detection algorithm 106 utilizes the frame count FC and frame hysteresis value $W_C$ in determining whether to report certain touch events TE, as will be described more detail below. The process proceeds from step 408 to step 410 to step 412 and sets the status to the stationary state. From step 412 the process returns to step 404.

When the determination in step 406 is negative, meaning the new touch event TE is not a touch-out event, the process proceeds to step 414 and the location associated with the new touch event is saved as a current location $P_{CURR}$ of the touch point P (X, Y) corresponding to the new touch event. The process then proceeds to step 416 and determines whether the new touch event TE is a touch-in event. When the determination in step 416 is positive the new touch event TE is indeed a touch-in event and the process proceeds to step 418. In step 418 the process resets the frame count FC=0 and proceeds to step 420 in which the process sets the value of a reference location $P_{REF}$ equal to the current location $P_{CURR}$. The reference location $P_{REF}$ is utilized in determining whether to report touch event TE that occur during the in-motion state, as will be described in more detail below. From step 420 the process goes to step 422 and sets the motion status to the stationary state. The process thereafter goes to step 424 and reports the touch information TI including the new touch event TE. The process then returns to step 404 and awaits the detection of a subsequent new touch event TE.

When the determination in step 416 is negative, the new touch event TE is neither a touch-out event (step 406) or a touch-in event (step 416), meaning the new touch event is a touch-motion event as indicated in step 426. From step 426 the process goes to step 428 and determines whether the difference $\Delta P$ between the current location $P_{CURR}$ and the reference location $P_{REF}$ is greater than the motion tolerance $W_T$. As discussed above, the difference $\Delta P$ is the difference between the locations of a prior touch point, the reference location $P_{REF}$ which may or may not be the location of the immediately prior touch point, and the current location $P_{CURR}$ of the new touch point P(X,Y). So $\Delta P=(|X_2-X_1|,|Y_2-Y_1|)$ where $(X_1,Y_1)$ correspond to the location of the reference location $P_{REF}$ and $(X_2,Y_2)$ correspond to the location of the new touch point P(X,Y).

When the determination is step 428 is positive, the difference $\Delta P$ is greater than the motion tolerance $W_T$ meaning that the new touch point P(X,Y) located farther than the motion tolerance from the reference location $P_{REF}$, indicating movement of new touch point across the touch screen 104 (FIG. 1). From step 428 the process goes to step 430 and resets the frame count FC=0. The process then goes to step 432 and sets the value of the reference location $P_{REF}$ to the current location $P_{CURR}$ of the new touch point P(X,Y). In this way, future calculations of the difference $\Delta P$ will be made with reference to the current location $P_{CURR}$ in determining whether the next new point P(X,Y) detected in step 404 has moved relative to the current point. From step 432 the process goes to step 434 and sets the motion status to the in-motion state. After step 434 the process goes to step 436 and report the new touch event TE detected in step 404, and thereafter returns to step 404 to await detection of the next new touch event TE.

When the determination is step 428 is negative, the location of the new touch point P(X,Y) has not moved by more than the motion tolerance $W_T$ relative to the reference location $P_{CURR}$. In this situation the process goes from step 428 to step 438 and determines whether the current motion status is the stationary state. When the current motion status is the stationary state the determination in step 438 is positive, and the process proceeds to step 440 and resets the frame count FC=0. From the step 440 the process goes to step 442 and blocks reporting of or does not report the touch information TI associated with the new touch point P(X,Y). In this way, the touch-motion detection algorithm 106 prevents "jitter" of newly detected new touch points P(X,Y) from causing unwanted or unintended operation of the application 110 (FIG. 1). More specifically, even though the current location $P_{CURR}$ of the new touch point P(X,Y) having the new touch event TE is not identical to the reference location $P_{REF}$, when the difference $\Delta P$ between these locations is not greater than the motion tolerance $W_T$ the touch-motion detection algorithm 106 blocks reporting of the new touch event TE to the application 110.

A brief example is now provided to illustrate the benefit of blocking reporting of the new touch event TE in this situation. Assume a user touched the touch screen 104 at an initial touch point corresponding to the reference location $P_{REF}$. Now assume the user has maintained his or her finger on the touch screen 104, intending not to have moved the finger from the reference location $P_{REF}$. Thus, the motion status of the touch point P(X,Y) is intended to be stationary since the user is not moving his or her finger across the touch screen 104. But now also assume that due to some unintended movement of the user's finger, the current location $P_{CURR}$ of the current touch point P(X,Y) is not the same as the reference location $P_{REF}$, where the difference $\Delta P$ in this situation can be termed jitter. Such unwanted jitter does not result in the application 110 taking unwanted or unintended action in response to the current location $P_{CURR}$ of the current touch point P(X,Y) being different than the reference location $P_{REF}$ by less than the motion tolerance $W_T$.

If the determination in step 438 is negative, then this means the motion status is the in-motion state and the process proceeds to step 444. In step 444, the frame count FC is incremented. So, for example, if the frame count FC has a value of 0, then in step 444 the frame count is incremented and FC=1. From step 444 the process goes to step 446 and determines whether the frame count FC is less than or equal to the frame hysteresis value $W_C$. When the determination in step 446 is positive this indicates that the value of the frame count FC has not yet exceeded the value of the frame hysteresis value $W_C$. In this situation, the process proceeds to step 448 and reports the touch information TI including the touch event TE associated with the current touch point P (X, Y).

When the determination in step 446 is negative, the value of the frame count FC exceeds the frame hysteresis value $W_C$, indicating that the difference $\Delta P$ between the of the current touch point P (X, Y) and the reference location $P_{REF}$ has not exceeded motion tolerance $W_T$ for $W_e$ new current touch points P(X,Y). In this situation, although the current motion status is in-motion, the fact that the current location $P_{CURR}$ has not exceeded the motion tolerance $W_T$ for touch point $W_C$ new current touch points P(X,Y) indicates that the user is not moving his or her finger across the touch screen 104, notwithstanding the slightly different locations $P_{CURR}$ for new touch points P(X,Y) relative to the reference location $P_{REF}$. Accordingly, the process in this situation goes from step 448 to step 450 and sets the motion status to stationary. The process then proceeds to step 452 and resets the frame count FC=0. From step 452 the process then goes to step 454 and blocks reporting of the touch information TI including the touch event TE associate with the current touch point P(X,Y), and thereafter returns to step 404.

Figure 4A:
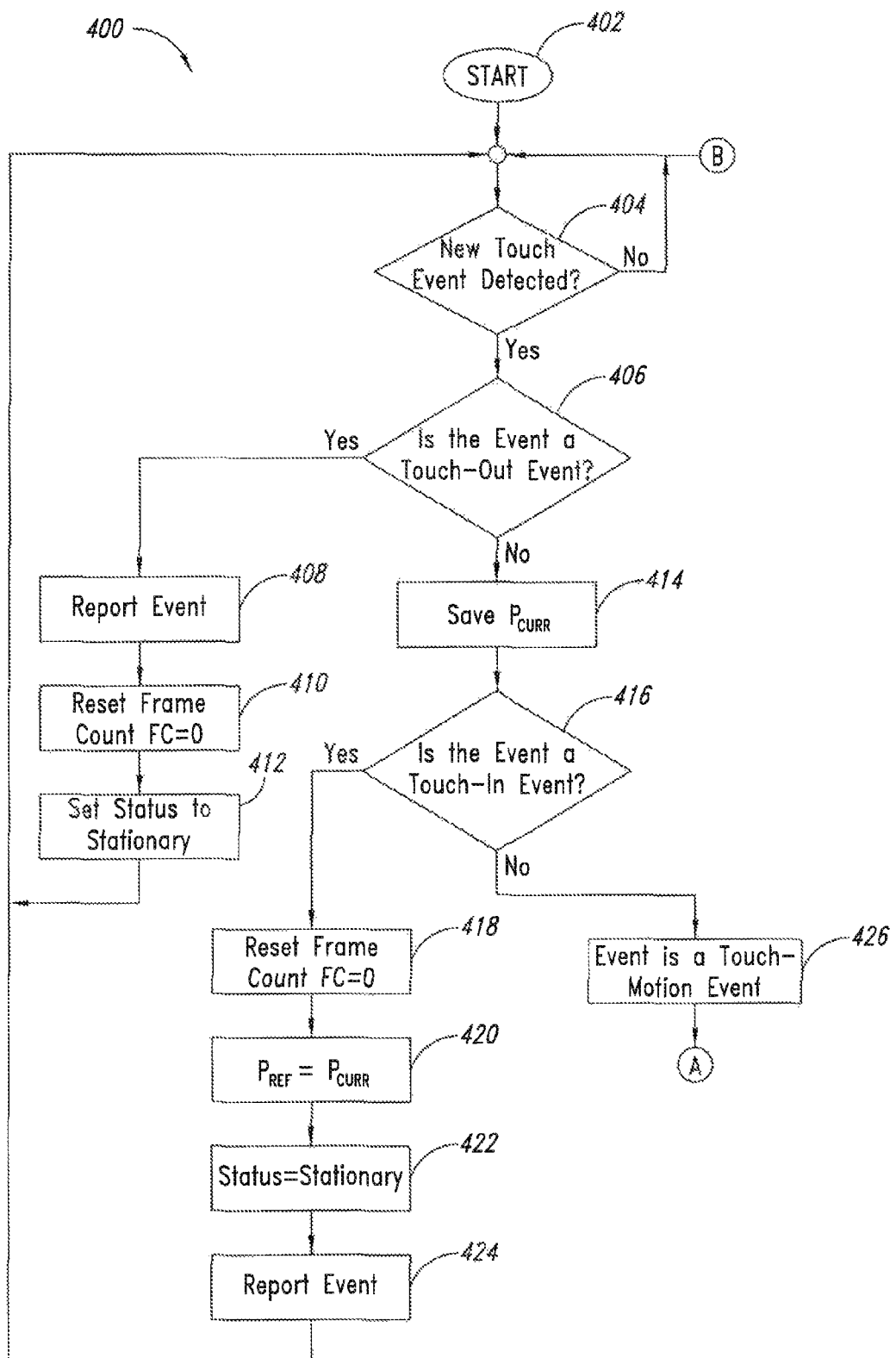
FIGS. 4A and 4B are a flowchart illustrating the operation of the touch controller of FIGS. 1 and 3 in detecting touch-in, touch-motion, and touch-out events according to one embodiment of the present invention.
Figure 4B:
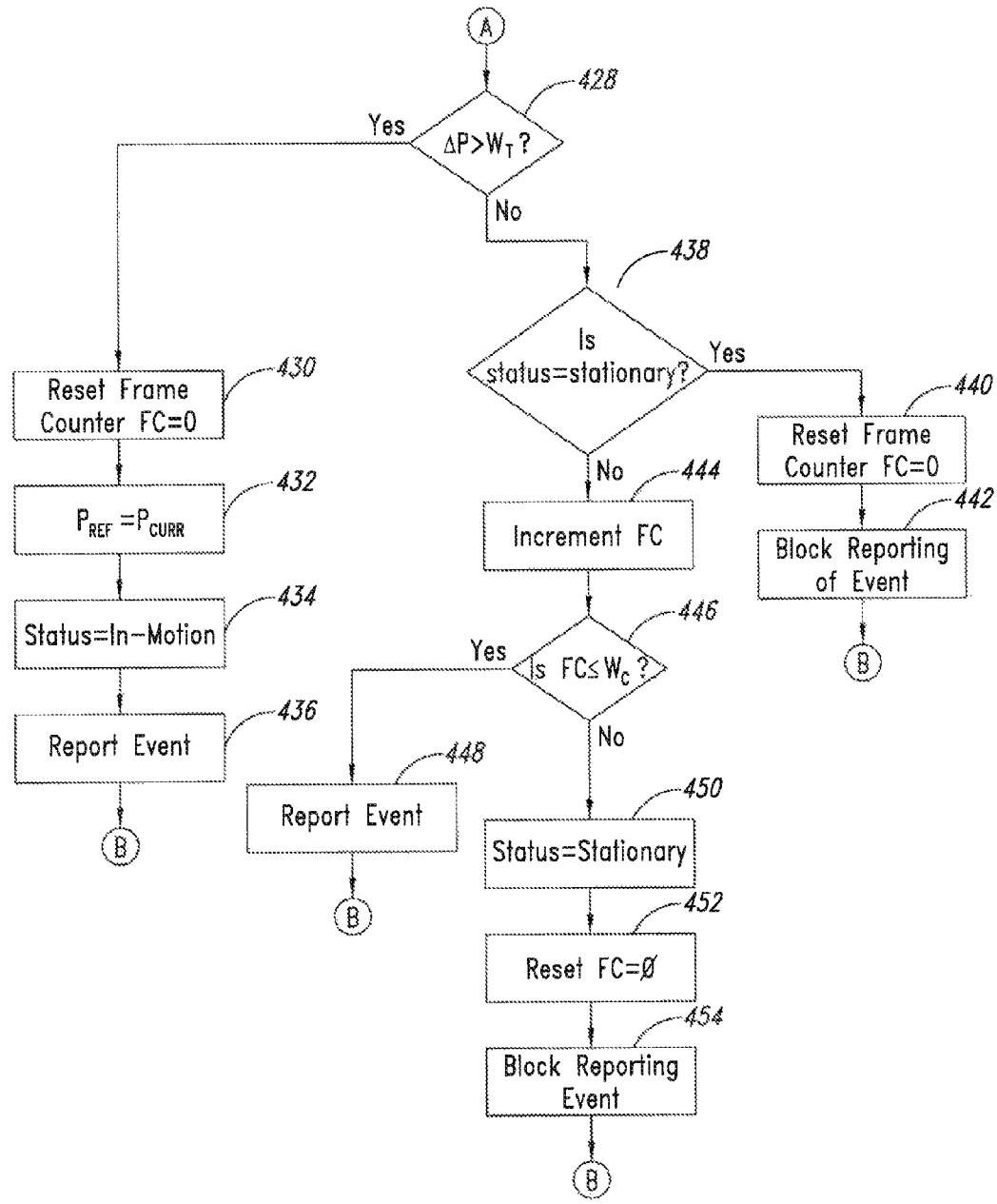
Figure 5:
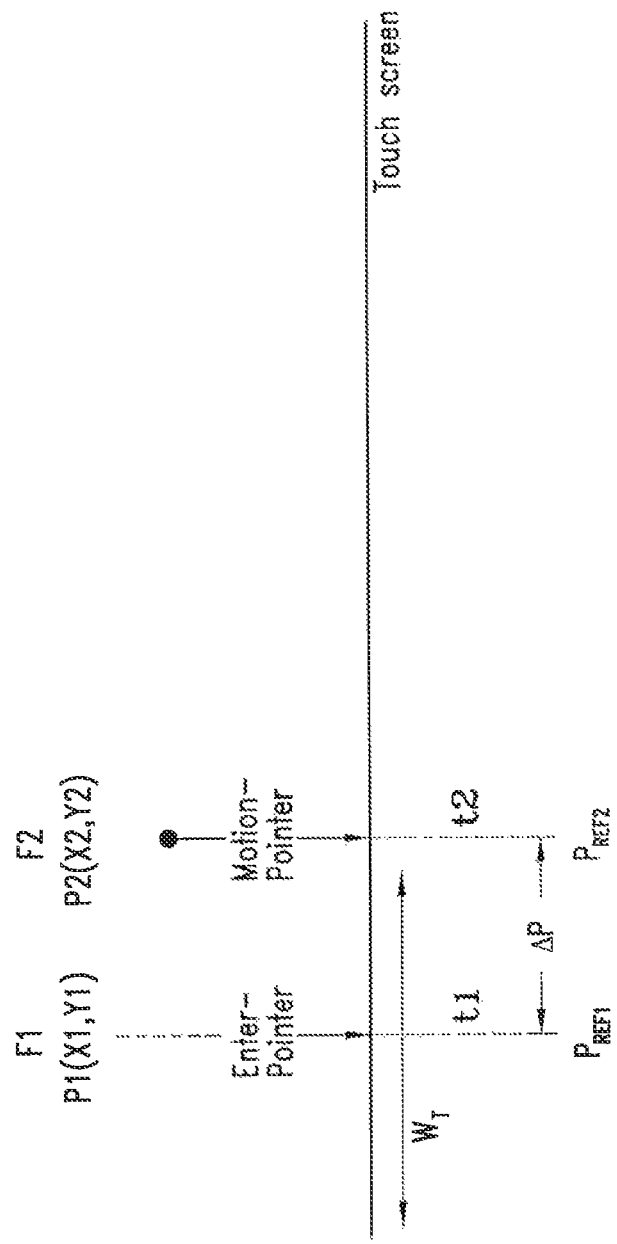
FIG. 5 is a diagram illustrating a touch-in event and a subsequent touch-motion event when the current motion status is the in-motion state during execution of the process of FIGS. 4A and 4B.

FIG. 5 is a diagram illustrating a touch-in event and a subsequent touch-motion event when the current motion status is the in-motion state during execution of the process 400 of FIGS. 4A and 4B. From an initial data frame F1 an initial touch point P1(X1,Y1) is detected at a time t1, and in this example the initial touch point corresponds to a touch-in event. As a result, the process 400 executes steps 416-424 of FIG. 4A, with the reference location $P_{REF}$ being set to the location of the initial point P1(X1,Y1) and being designated $P_{REF1}$ in FIG. 5. Also note the motion status is initially set to the stationary state in step 422. Subsequently, as part of a second data frame F2, a second touch point P2(X2,Y2) is detected at a time t2. This second touch point P2(X2,Y2) will be a touch-motion event due to the prior detection of the touch-in event of the point P1(X1,Y1) at time t1.

In the example of FIG. 5, X1≠X2 and Y1≠Y2 and also the difference ΔP is greater than the motion tolerance $W_T$. As a result, the determination in step 428 is positive and so the process executes steps 430-436. Accordingly, in step 432 the reference location $P_{REF}$ is set equal to the location of the second touch point P2(X2,Y2), which is designated $P_{REF2}$, and the motion status is set to the in-motion state. This indicates the touch point P(X,Y) of the user is moving across the touch screen 104. Accordingly, the second touch point P2(X2,Y2) is reported to the application 110 in step 436 so that the application can suitably control operation of the electronic device 100 in response to the moving touch point.

Figure 6:
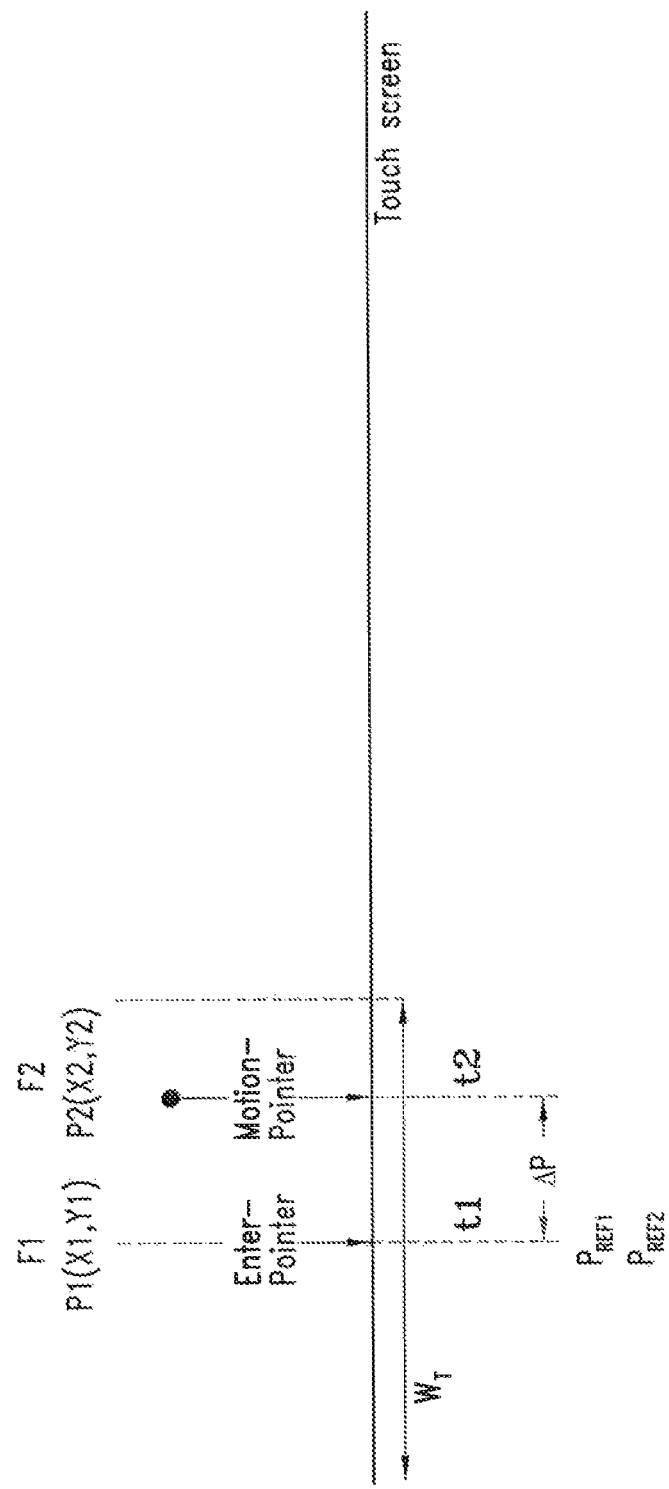
FIG. 6 is a diagram illustrating a touch-in event and a subsequent touch-motion event when the current motion status is the stationary state during execution of the process of FIGS. 4A and 4B.

FIG. 6 is a diagram illustrating a touch-in event and a subsequent touch-motion event when the current motion status is the stationary state during execution of the process of FIGS. 4A and 4B. From an initial data frame F1 an initial touch point P1(X1,Y1) is again detected at a time t1, and in this example the initial touch point once again corresponds to a touch-in event. As a result, the process 400 once again executes steps 416-424 of FIG. 4A, with the reference location $P_{REF}$ being set to the location of the initial point P1(X1,Y1) and being designated $P_{REF1}$ in FIG. 6. The motion status is initially set to the stationary state in step 422.

Subsequently, as part of a second data frame F2, a second touch point P2(X2,Y2) is detected at a time t2. This second touch point P2(X2,Y2) will be a touch-motion event due to the prior detection of the touch-in event of the point P1(X1,Y1) at time t1. In the example of FIG. 6, X1≠X2 and Y1≠Y2 but in this example the difference ΔP is less than the motion tolerance $W_T$. Thus, the location of the second touch point P2(X2,Y2) is within the defined motion tolerance $W_T$. As a result, the determination in step 428 is negative and so the process next executes step 438. The current motion status is stationary so the determination in step 438 is positive meaning that the process resets the frame count FC=0 in step 440 and thereafter proceeds to step 442 and blocks reporting of the touch-motion event associated with the second touch point P2(X2,Y2). Notice in FIG. 6 that in this situation the reference location $P_{REF}$ remains the reference location $P_{REF1}$ of the initial touch point P1(X1,Y1). Thus, the reference location $P_{REF}$ after the second touch point P2(X2,Y2), which is designated $P_{REF2}$ in FIG. 6, is the same as the reference location $P_{REF1}$.

In the example of FIG. 6 where the location of the second touch point P2(X2,Y2) is within the motion tolerance $W_T$, the motion status remains in the stationary state such that the determination in step 438 is positive and after resetting the frame count FC=0 in step 440 the reporting of the touch-motion event associated with the second touch point P2(X2,Y2) is blocked in step 442. In this way, touch events associated with a touch point P(X,Y) that is within the motion tolerance $W_T$ are not reported to the application 110 because in this situation the second touch point P2(X2,Y2), although not identical to the initial touch point P1(X1,Y1), is deemed to not indicate real or intended movement of the touch point across the touch screen 104. Accordingly, reporting of the second touch point P2(X2,Y2) to the application 110 is blocked so that the application, reducing power consumption involved with unnecessarily reporting the second touch point and preventing the application from perhaps taking some unwanted or unintended action in response to the second touch point. For example, if application 110 operates such that application takes action in response to any new location of a most recently reported touch point P (X, Y), then the application could take some unwanted or unintended action in response to the second touch point P2(X2,Y2) even though the user had not intentionally moved his or her finger across the touch screen 104 to intentionally cause the second touch point.

Figure 7:
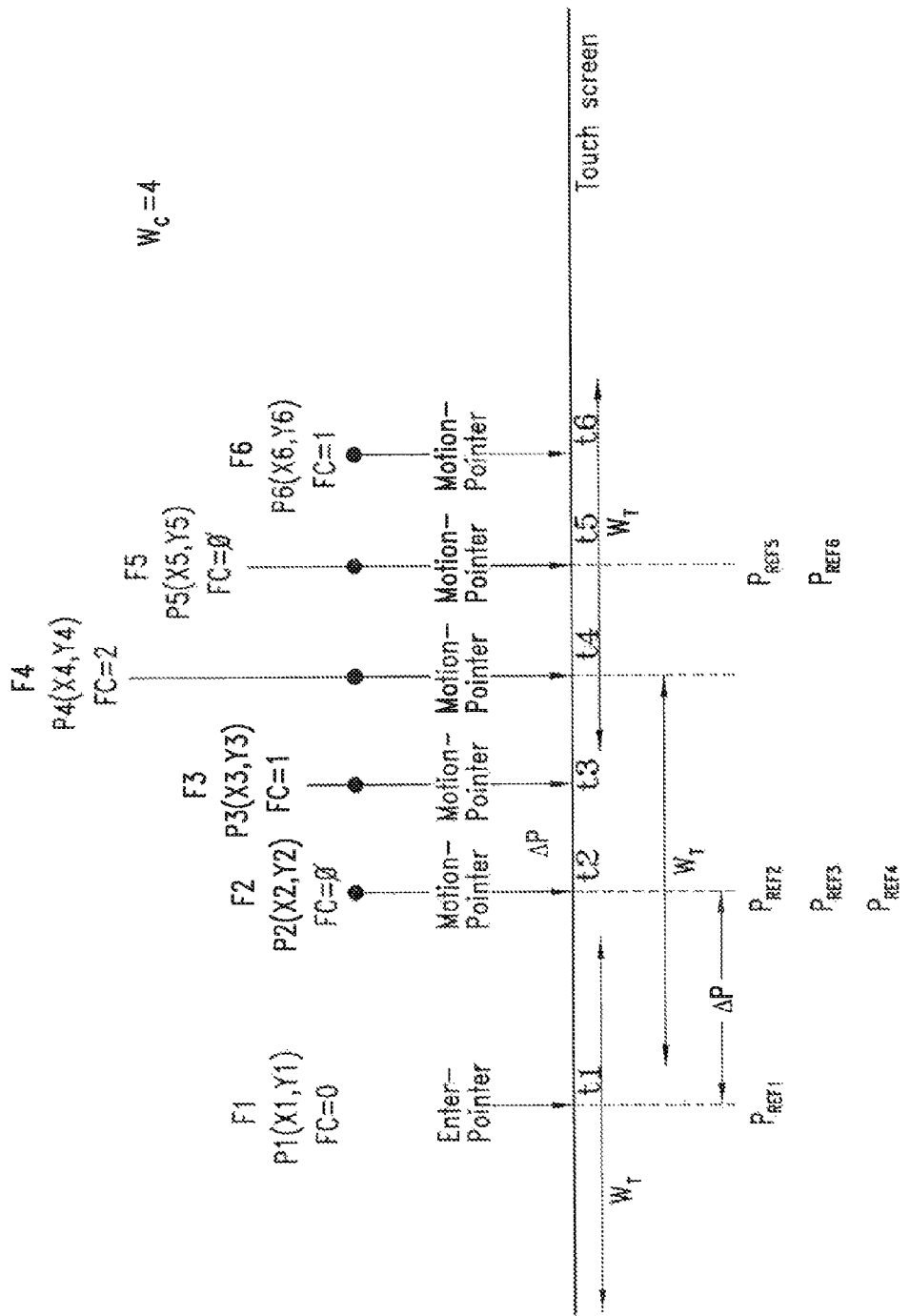
FIG. 7 is a diagram illustrating a touch-in event and subsequent touch-motion events showing movement of the touch point and functioning of the frame hysteresis value in the in-motion state and during execution of the process 400 of FIGS. 4A and 4B.

FIG. 7 is a diagram illustrating a touch-in event and subsequent touch-motion events showing movement of the touch point and functioning of the frame hysteresis in the in-motion state and during execution of the process 400 of FIGS. 4A and 4B. From an initial data frame F1 an initial touch point P1(X1, Y1) is detected at a time t1, and in this example the initial touch point corresponds to a touch-in event. As a result, the process 400 executes steps 416-424 of FIG. 4A, with the reference location $P_{REF}$ being set to the location of the initial point P1(X1,Y1) and being designated $P_{REF1}$ in FIG. 7. The motion status is initially set to the stationary state in step 422.

Subsequently, as part of a second data frame F2, a second touch point P2(X2,Y2) is detected at a time t2. This second touch point P2(X2,Y2) will be a touch-motion event due to the prior detection of the touch-in event of the point P1(X1, Y1) at time t1. In FIG. 7, X1≠X2 and Y1≠Y2 and the difference ΔP for these two points is greater than the motion tolerance $W_T$. As a result, the determination in step 428 is positive and so the process executes steps 430-436. Accordingly, in step 432 the reference location $P_{REF}$ is set equal to the location of the second touch point P2(X2,Y2), which is designated $P_{REF2}$, and the motion status is set to the in-motion state. This indicates the touch point P(X,Y) of the user is moving across the touch screen 104. Accordingly, the second touch point P2(X2,Y2) is reported to the application 110 in step 436 so that the application can suitably control operation of the electronic device 100 in response to the moving touch point. Note the frame count FC=0 after the detection of P1(X1,Y1) and P2(X2,Y2) in frames F1 and F2.

A data frame F3 and third touch point P3(X3,Y3) are next detected at a time t3 in the example of FIG. 7. This third second touch point P3(X3,Y3) will be a touch-motion event due to the prior detection of the touch-motion event of point P2(X2,Y2). Once again, X2≠X3 and Y2≠Y3 but this time the difference ΔP is less than the motion tolerance $W_T$. As a result, the location of the third touch point P3(X3,Y3) is within the defined motion tolerance $W_T$. So the determination in step 428 is negative and the process next executes step 438. The current motion status is the in-motion state and so the determination in step 438 is negative so the process goes to step 444 and increments the frame count FC=1 in step 444. The process then goes to step 446 and determines whether the frame count FC is less than or equal to the frame hysteresis value $W_C$. The frame hysteresis value $W_C$ is equal to 4 as indicated in the example of FIG. 7. Accordingly, the determination in step 446 is positive and the process proceeds to step 448 and reports the touch-motion event associated with the third touch point P3(X3,Y3). Note the reference location $P_{REF3}$ associated with the third touch point P3(X3,Y3) is not changed because the difference ΔP is less than the motion tolerance $W_T$ and so the current reference location remains the same, namely the reference location $P_{REF2}$ as seen in FIG. 7.

Next in a data frame F4, a fourth touch point P4(X4,Y4) is detected at a time t4. This fourth touch point P4(X4,Y4) will be a touch-motion event due to the prior detection of the touch-motion event of point P3(X3,Y3). Once again, X3≠X4 and Y3≠Y4 and once again the difference ΔP is less than the motion tolerance $W_T$. As a result, the location of the fourth touch point P4(X4,Y4) is within the defined motion tolerance $W_T$. So the determination in step 428 is again negative and the process next executes step 438. The current motion status is the in-motion state and so the determination in step 438 is negative so the process goes to step 444 and increments the frame count FC=2 in step 444. The process then goes to step 446 and determines whether the frame count FC is less than or equal to the frame hysteresis value $W_C$. The frame hysteresis value $W_C$=4 and so FC=2 is indeed less than $W_C$=4. Accordingly, the determination in step 446 is positive and the process proceeds to step 448 and reports the touch-motion event associated with the fourth touch point P4(X4,Y4). Note the reference location $P_{REF4}$ associated with the fourth touch point P4(X4,Y4) is not changed because the difference ΔP is less than the motion tolerance $W_T$ and so the current reference location remains the same, namely the reference location $P_{REF2}$.

In a subsequent data frame F5, a fifth touch point P5(X5, Y5) is detected at a time t5. This fifth touch point P5(X5,Y5) will be a touch-motion event due to the prior detection of the touch-motion event of point P4(X4,Y4). Once again, X4≠X5 and Y4≠Y5 but this time the difference ΔP is greater than the motion tolerance $W_T$. As a result, the location of the fifth point P5(X5,Y5) is outside the defined motion tolerance $W_T$. So the determination in step 428 is positive and the process next executes step 430 and resets the frame count FC=0. The process then goes to step 432 and sets the value of the reference location $P_{REF}$ to the current location $P_{CURR}$ of the new touch point P5(X5,Y5) as seen in FIG. 7. From step 432 the process goes to step 434 and sets the motion status to the in-motion state, which was already the current motion status. After step 434 the process goes to step 436 and reports the touch-motion event associated with touch point P5(X5,Y5). Thus, the touch-motion event associated with the fifth touch point P5(X5,Y5) is properly reported to the application 110 (FIG. 1) and the reference location $P_{REF}$ set to the location of touch point P5(X5,Y5), namely $P_{REF5}$.

Finally, a data frame F6 and sixth touch point P6(X6,Y6) are detected at a time t6 in the example of FIG. 7. This sixth touch point P6(X6,Y6) will be a touch-motion event due to the prior detection of the touch-motion event of point P5(X5, Y5). Once again, X5≠X6 and Y5≠Y6 but this time the difference ΔP is less than the motion tolerance $W_T$. As a result, the location of the sixth touch point P6(X6,Y6) is within the defined motion tolerance $W_T$. So the determination in step 428 is negative and the process next executes step 438. The current motion status is the in-motion state and so the determination in step 438 is negative and the process goes to step 444 and increments the frame count FC=1 in step 444. The process then goes to step 446 and determines whether the frame count FC is less than or equal to the frame hysteresis value $W_C$. The frame hysteresis value $W_C$ is equal to 4 and accordingly the determination in step 446 is positive and the process proceeds to step 448 and reports the touch-motion event associated with the sixth touch point P6(X6,Y6). Note the reference location $P_{REF6}$ associated with the sixth touch point P6(X6,Y6) is not changed because the difference ΔP is less than the motion tolerance $W_T$ and so the current reference location remains the same, namely the reference location $P_{REF5}$ as seen in FIG. 7.

Figure 8:
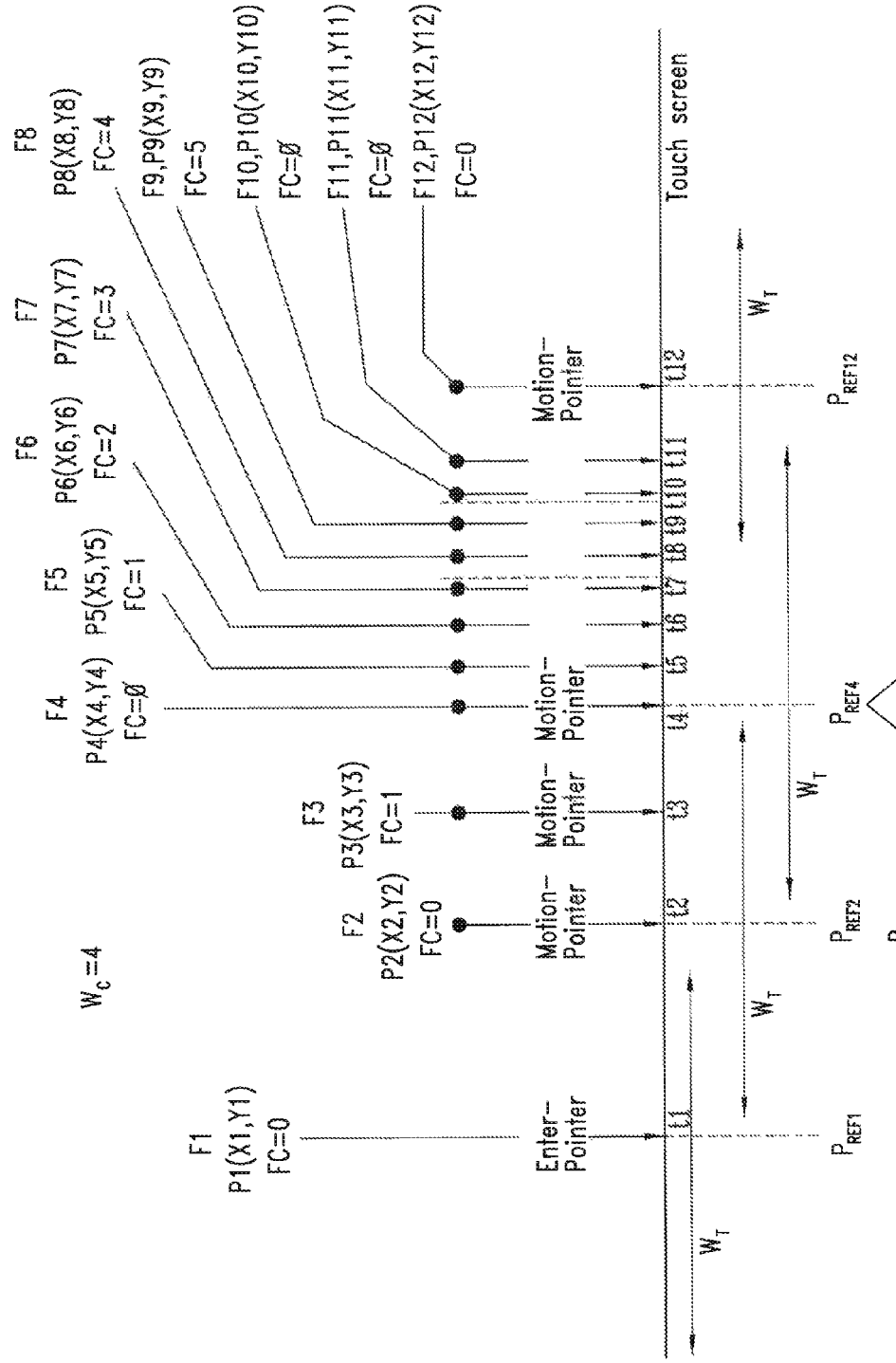
FIG. 8 is a diagram illustrating a touch-in event and subsequent touch-motion events showing initial movement and then stopping of the touch point during execution of the process of FIGS. 4A and 4B.

FIG. 8 is a diagram illustrating a touch-in event and subsequent touch-motion events showing initial movement and then stopping of a touch point P(X,Y) on the touch screen 104 during execution of the process 400 of FIGS. 4A and 4B. In an initial data frame F1 an initial touch point P1(X1,Y1) is detected at a time t1, and in this example the initial touch point corresponds to a touch-in event. As a result, the process 400 executes steps 416-424 of FIG. 4A, with the reference location $P_{REF}$ being set to the location of the initial point P1(X1, Y1) and being designated $P_{REF1}$ in FIG. 8. The motion status is initially set to the stationary state in step 422.

A second data frame F2 includes detection of a second touch point P2(X2,Y2) at a time t2. This second touch point P2(X2,Y2) will be a touch-motion event due to the prior detection of the touch-in event of the point P1(X1,Y1) at time t1. In FIG. 8, X1≠X2 and Y1≠Y2 and the difference ΔP for these two points is greater than the motion tolerance $W_T$. As a result, the determination in step 428 is positive and so the process executes steps 430-436. Accordingly, in step 432 the reference location $P_{REF}$ is set equal to the location of the second touch point P2(X2,Y2), which is designated $P_{REF2}$, and the motion status is set to the in-motion state. This indicates the touch point P(X,Y) of the user is moving across the touch screen 104. Accordingly, the second touch point P2(X2, Y2) is reported to the application 110 in step 436 so that the application can suitably control operation of the electronic device 100 in response to the moving touch point. Note the frame count FC=0 after the detection of P1(X1,Y1) and P2(X2,Y2) in frames F1 and F2.

A data frame F3 and third touch point P3(X3,Y3) are next detected at a time t3 in the example of FIG. 8. This third second touch point P3(X3,Y3) will be a touch-motion event due to the prior detection of the touch-motion event of point P2(X2,Y2). Once again, X2≠X3 and Y2≠Y3 but this time the difference ΔP is less than the motion tolerance $W_T$. As a result, the location of the third touch point P3(X3,Y3) is within the defined motion tolerance $W_T$. So the determination in step 428 is negative and the process next executes step 438. The current motion status is the in-motion state and so the determination in step 438 is negative and the process goes to step 444 and increments the frame count FC=1 in step 444. The process then goes to step 446 and determines whether the frame count FC is less than or equal to the frame hysteresis value W. The frame hysteresis value $W_e$ is once again equal to 4 as indicated in the example of FIG. 8. Accordingly, the determination in step 446 is positive and the process proceeds to step 448 and reports the touch-motion event associated with the third touch point P3(X3,Y3). Note the reference location $P_{REF3}$ associated with the third touch point P3(X3, Y3) is not changed because the difference ΔP is less than the motion tolerance $W_T$ and so the current reference location remains the same, namely the reference location $P_{REF2}$ as seen in FIG. 8.

In a subsequent data frame F4, a fourth touch point P4(X4, Y4) is detected at a time t4. This fourth touch point P4(X4, Y4) will be a touch-motion event due to the prior detection of the touch-motion event of point P3(X3,Y3). Once again, X3≠X4 and Y3≠Y4 but this time the difference ΔP is greater than the motion tolerance $W_T$. As a result, the location of the fourth touch point P4(X4,Y4) is outside the defined motion tolerance $W_T$. So the determination in step 428 is positive and the process next executes step 430 and resets the frame count FC=0. The process then goes to step 432 and sets the value of the reference location $P_{REF}$ to the current location $P_{CURR}$ of the new touch point P4(X4,Y4) as seen in FIG. 7. From step 432 the process goes to step 434 and sets the motion status to the in-motion state, which was already the current motion status. After step 434 the process goes to step 436 and reports the touch-motion event associated with touch point P4(X4, Y4). Thus, the touch-motion event associated with the fourth touch point P5(X5,Y5) is properly reported to the application 110 (FIG. 1) and the reference location $P_{REF}$ set to the location of touch point P4(X4,Y4), namely $P_{REF4}$.

Next, successive data frames F5-F11 and corresponding touch points P5(X5,Y5)-P11(X11,Y11) are detected at times t5-t11 as seen in the example of FIG. 8. Once again, each of these points P(X,Y) has a different location than any of the other points, namely X4≠X5≠X6≠X7≠X8≠X9≠X10≠X11 and Y4≠Y5≠Y6≠Y7≠Y8≠Y9≠Y10≠Y11. Also note that the location difference ΔP between each of these points P5(X5,Y5)-P11(X11,Y11) and the reference location $P_{REF4}$ is less than the motion tolerance $W_T$. As a result, the locations of each of the touch points P5(X5,Y5)-P11(X11,Y11) is within the defined motion tolerance $W_T$. So the determination in step 428 for each of these touch points P5(X5,Y5)-P11(X11,Y11) is negative and the process accordingly goes on to step 438 in each instance.

The successive or consecutive touch points P5(X5,Y5)-P11(X11,Y11) within the motion tolerance $W_T$ illustrate the operation and functionality of the frame hysteresis value $W_e$ and frame count FC, as will now be explained in more detail. For frame F5 and touch point P5(X5,Y5) the current motion status is the in-motion state and so the determination in step 438 is negative and the process goes to step 444 and increments the frame count FC=1 in step 444. The process then goes to step 446 and determines whether the frame count FC is less than or equal to the frame hysteresis value $W_C$. The frame hysteresis value $W_C$ is equal to 4 and accordingly the determination in step 446 is positive and the process proceeds to step 448 and reports the touch-motion event associated with the sixth touch point P5(X5,Y5). Note the reference location $P_{REF5}$ associated with the fifth touch point P5(X5,Y5) is not changed because the difference ΔP is less than the motion tolerance $W_T$ and so the current reference location remains the same, namely the reference location $P_{REF4}$ as seen in FIG. 8.

The operation for frames F6-F9 and touch points P6(X6,Y6)-P9(X9,Y9) is the same as that just described for frame F5 and touch point P5(X5,Y5). Each time the determination in step 438 is negative because the current motion status is in-motion and so the process proceeds to step 444 in successively increments the frame count FC in frames F6-F9. Thus, for frame F6 and touch point P6(X6,Y6) the frame count FC=2, in frame F7 and touch point P7(X7,Y7) the frame count FC=3, in frame F8 and touch point P8(X8,Y8) the frame count FC=4, and in frame F9 the frame count FC=5 after being incremented in step 444 (FIG. 4B). As a result, for each of the touch points P6(X6,Y6)-P8(X8,Y8) the determination in step 446 is positive and the process then proceeds to step 448 and reports each of these touch-motion events to the application 110. Thus even though none of the touch points P5(X5,Y5)-P8(X8,Y8) has moved outside the motion tolerance $W_T$, each of these touch points is reported to the application 110.

For the touch point P9(X9,Y9), after the frame count FC is incremented in step 444 the process proceeds to step 446 and the frame count FC=5 is now greater than the frame hysteresis value $W_C$, and so the determination in step 446 is negative and the process proceeds to step 450. In step 450 the motion status is set the stationary state and then in step 452 the frame count FC is reset to 0 and the reporting of the touch-motion event associated with touch point P9(X9,Y9) is blocked in step 454. In this way, the process 400 corresponding to one embodiment of the touch-motion detection algorithm 106 (FIG. 1) functions to provide a hysteresis around the current reference location $P_{REF}$ for the purpose of limiting the reporting of current touch events TE to the application 110 when the corresponding touch points P(X,Y) are within the motion tolerance $W_T$ (i.e., are very close to the current reference location $P_{REF}$). The touch points P5(X5,Y5)-P8(X8,Y8) are reported to the application 110 even though each of these touch points is within the motion tolerance $W_T$. Once a certain number of such successive touch points P(X,Y) have been reported, with the certain number being defined by the frame hysteresis value $W_C$, the process 400 terminates reporting of future touch points within the motion tolerance $W_T$. Accordingly, the touch points P9(X9,Y9)-P11(X11,Y11) are blocked from being reported to the application 110. The touch point P9(X9,Y9) is the first that is blocked as described above and thereafter for each of the touch points P10(X10,Y10) and P11(X11,Y11) the determination in step 438 of the process 400 (FIG. 4B) is negative such that steps 440 in 442 are subsequently executed and the reporting of the touch event for these touch points is blocked.

In the example of FIG. 8, at a time t12 a data frame F12 and touch point P12(X12,Y12) are detected, where the location of the touch point P12(X12,Y12) is greater than the motion tolerance $W_T$ associated with the prior reference location $P_{REF11}$, which is the reference location $P_{REF4}$ as seen in FIG. 8. As a result, for the touch point P12(X12,Y12) the difference ΔP is greater than the motion tolerance $W_T$ in step 428 (FIG. 4B) and thus the process subsequently execute steps 430-436 in which the frame count FC is reset to 0, the reference location $P_{REF}$ is set equal to the location of the touch point P12(X12,Y12), which is designated $P_{REF12}$ in FIG. 8, and the motion status is set to the in-motion state, and touch event TE associated with the touch point P12(X12,Y12) is reported to the application 110.

Figure 9:
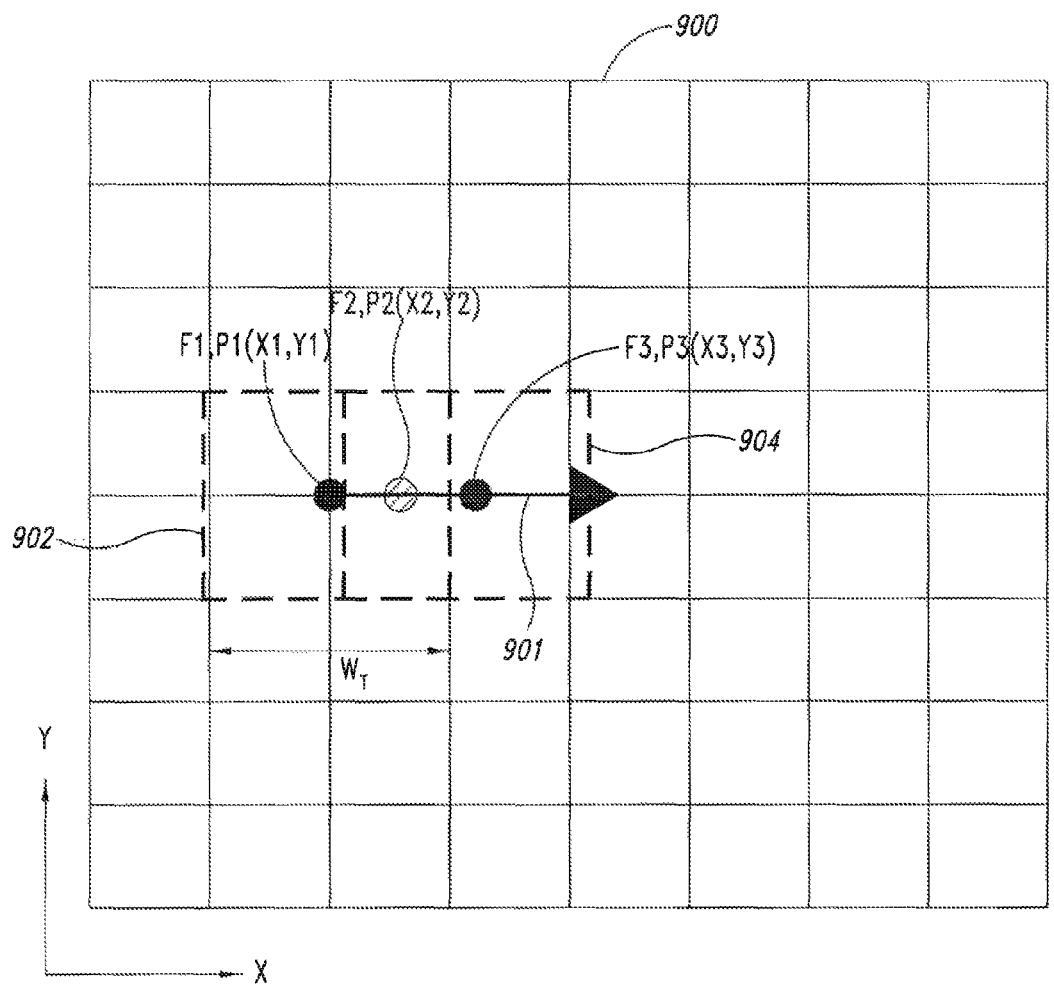
FIG. 9 is a top view of a portion of the touch screen of FIG. 1 illustrating an alternative graphical diagram showing sequential touch events that occur during execution of the touch-motion detection algorithm 106 of FIG. 1 and the process 400 of FIGS. 4A and 4B.

FIG. 9 is a top view of a portion of the touch screen 104 of FIG. 1 illustrating an alternative graphical presentation of sequential touch events that occur during execution of the touch-motion detection algorithm 106 of FIG. 1 and the process 400 of FIGS. 4A and 4B. FIG. 9 includes a grid 900 that represents pixels at the intersection of the horizontal and vertical lines forming the grid. The X-axis and Y-axis of the grid 900 are shown in the figure. FIG. 9 shows three successive frames F1, F2 and F3, each including a corresponding touch point P1(X1,Y1), P2(X2,Y2) and P3(X3,Y3). An arrow 901 indicates the direction of motion of the touch points P(X,Y) by a user (not shown) on the touch screen 104. As arrow 901 indicates, the motion is from left to right along the X-axis in the example of FIG. 9.

The initial touch point P1(X1,Y1) on the touch screen 104 is a touch-in event, with the associated motion status being set to stationary and the reference location $P_{REF}$ being set to the initial touch point, as previously described with reference to FIG. 5, for example. The dotted line 902 around the initial touch point P1(X1,Y1) graphically illustrates the motion tolerance $W_T$ associated with the initial touch point. The second touch point P2(X2,Y2) on the touch screen 104 is a touch-motion event within the motion tolerance $W_T$, so the motion status remains stationary and the touch-motion event is not reported to the application 110. The reference location $P_{REF}$ also remains unchanged and thus remains equal to the initial touch point P1(X1,Y1), so the motion tolerance $W_T$ remains the same as represented by the dotted line 902. Finally, the third touch point P3(X3,Y3) on the touch screen 104 is a touch-motion event outside the motion tolerance $W_T$, so the motion status remains is changed to the touch-motion state, the touch-motion event is reported to the application 110, and the reference location $P_{REF}$ is changed to the third touch point P3(X3,Y3), with the motion tolerance $W_T$ now being represented by the dotted line 904.

The type of applications 110 executing on the processing circuitry 108 will vary depending on the type of electronic device 100. Where the electronic device 100 is a cell or smart phone or a tablet computer, for example, the applications 110 can include a wide variety of different types of applications, such as music applications, email applications, video applications, game applications, reading applications, and so on.

One skilled in the art will understood that even though various embodiments and advantages of the present invention have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate, may be realized through software executing on suitable processing circuitry. Therefore, the present invention is to be limited only by the appended claims.

What is claimed is:

1. A touch controller, comprising:
   a touch frame processing component adapted to receive sensor signals indicating a touch point on a touch screen, the touch frame processing component operable to process the sensor signals to generate touch information associated with each touch point, the touch information including a location of the touch point and one of a touch-in, touch-out, and touch-motion type of event associated with the touch point;
   a touch coordinate processing component coupled to the touch frame processing component, the touch coordinate processing component operable to
     receive the touch information from the touch frame processing component; and
     determine whether to report the touch information for touch-motion events associated with a current touch point by
       determining a difference between the location of the current touch point and the location of a previously detected touch point,
       assigning to each touch-motion event a motion status that includes either a stationary state or an in-motion state,
       reporting the touch information associated with the current touch point when the difference is greater than a motion tolerance threshold, and
       selectively outputting a touch information signal based on the corresponding motion status when the difference is less than the motion tolerance threshold,
   and
   a FIFO buffer circuit that stores touch information and provides the touch information to applications external to the touch controller on a first-in-first-out basis upon detection of a touch-out event or a touch-in event and in the absence of a touch-motion event.

2. The touch controller of claim 1, wherein the touch coordinate processing component is operable to always report a touch-in type of event.

3. The touch controller of claim 1, wherein the touch coordinate processing component is operable to always report a touch-out type of event.

4. The touch controller of claim 1, wherein each component comprises a software module executing on suitable digital circuitry.

5. The touch controller of claim 1, wherein the touch information further includes pressure and size information for each touch point.

6. A method of determining whether to report the detection of a touch-motion event in an electronic device including a touch screen, the method comprising:
   determining a difference between the location of a first touch point and the location of a subsequently detected second touch point, irrespective of touch pressure;
   reporting the touch-motion event when the difference is greater than or equal to a motion tolerance threshold,
     determining whether or not the status is a stationary state when the difference is less than the motion tolerance threshold; and
     reporting the touch-motion event when t-h-ea frame hysteresis value has not reached the threshold value, irrespective of touch pressure.

7. The method of claim 6, wherein the first touch point is a reference touch point corresponding to the location of a previous touch event.

8. The method of claim 7,
   wherein the reference touch point is the location of a prior touch event when the prior touch event is a touch-in event; and
   wherein the reference touch point is the location of a prior touch event when the prior touch event is a touch-motion event and the difference is less than the motion tolerance threshold.

9. The method of claim 1 further comprising when the difference is greater than or equal to a motion tolerance threshold:
   resetting a frame count; and
   setting a location of a reference touch point equal to the location of the second touch point.

10. The method of claim 1, wherein blocking reporting of the second touch event when the status is the in-motion state and a frame hysteresis value has reached a threshold value includes resetting the frame count.

11. An electronic system, comprising:
    processing circuitry;
    a touch screen;
    a touch controller coupled to the processing circuitry and the touch screen, the touch controller including a touch frame processing component adapted to receive sensor signals from the touch screen, the sensor signals containing information about a touch point on the touch screen, the touch frame processing component operable to process the sensor signals to generate touch information associated with each touch point, the touch information including a location of the touch point and the association of one of a touch-in, touch-out, and touch-motion type of event with the touch point; and
    a touch coordinate processing component coupled to receive touch information from the touch frame processing component and operable to:
      determine, for touch-motion events, whether to report touch information associated with a current touch point to the processing circuitry,
      determine a difference between the location of the current touch point and the location of a previously detected touch point,
      assign a motion status to each touch-motion event,
      report the touch information associated with the current touch point when the difference is greater than a motion tolerance threshold,
      when the difference is less than the motion tolerance, to selectively block or report the touch information as a function of the corresponding motion status; and
    a FIFO buffer circuit that stores touch information and provides the touch information to applications external to the touch controller on a first-in-first-out basis upon detection of a touch-out event or a touch-in event and in the absence of a touch-motion event.

12. The electronic system of claim 11, wherein the processing circuitry comprises cellular telephone processing circuitry.

13. The electronic system of claim 11, wherein the touch screen comprises a capacitive touch screen.

14. The electronic system of claim 11, wherein the touch coordinate processing component is operable to report a touch event when the touch event is a touch-in type of event.

15. The electronic system of claim 11, wherein the touch coordinate processing component is operable to report a touch event when the touch is a touch-out type of event.

16. The electronic system of claim 11, wherein each component comprises a software module executing on suitable digital circuitry.

17. The electronic system of claim 11, wherein the touch information further includes identification, pressure and size information for each touch point.

18. The touch controller of claim 1 wherein the touch information signal blocks reporting of the touch information when the motion status is stationary.

19. The touch controller of claim 1 wherein the touch information signal reports the touch information when the motion status is in-motion.

* * * * *